US008362898B2

(12) United States Patent
Berstis et al.

(10) Patent No.: US 8,362,898 B2
(45) **Date of Patent: *Jan. 29, 2013**

(54) KEY FOB AND SYSTEM FOR INDICATING THE LOCK STATUS OF A DOOR LOCK

(75) Inventors: Viktors Berstis, Austin, TX (US); Creighton Matthew Hicks, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1281 days.

This patent is subject to a terminal disclaimer.

(21) Appl. No.: 12/127,816

(22) Filed: May 28, 2008

(65) Prior Publication Data

US 2009/0002153 A1 Jan. 1, 2009

Related U.S. Application Data

(63) Continuation of application No. 11/382,764, filed on May 11, 2006, now Pat. No. 7,898,382.

(51) Int. Cl.
*H04Q 7/00* (2006.01)

(52) U.S. Cl. .................................................. 340/539.11

(58) Field of Classification Search ............. 340/426.24, 340/426.28, 426.15, 545.1, 5.7, 5.72, 539.11
See application file for complete search history.

(56) References Cited

U.S. PATENT DOCUMENTS

| | | | | |
|---|---|---|---|---|
| 3,828,307 | A * | 8/1974 | Hungerford | 340/909 |
| 5,327,144 | A * | 7/1994 | Stilp et al. | 342/387 |
| 5,568,120 | A | 10/1996 | LeMense et al. | |
| 5,790,065 | A | 8/1998 | Yaroch | |
| 5,796,827 | A * | 8/1998 | Coppersmith et al. | 713/182 |
| 6,097,282 | A | 8/2000 | Wang | |
| 6,144,293 | A * | 11/2000 | Plaschko et al. | 340/426.14 |
| 6,259,362 | B1 | 7/2001 | Lin | |
| 6,429,773 | B1 | 8/2002 | Schuyler | |
| 6,703,919 | B2 | 3/2004 | Baset | |
| 6,963,280 | B2 * | 11/2005 | Eskildsen | 340/542 |
| 7,142,089 | B2 * | 11/2006 | Yamagishi | 340/5.52 |
| 2003/0085789 | A1 * | 5/2003 | Nowak | 336/225 |
| 2004/0178880 | A1 | 9/2004 | Meyer et al. | |
| 2005/0134477 | A1 | 6/2005 | Ghabra et al. | |
| 2006/0202881 | A1 * | 9/2006 | Buccinna et al. | 341/176 |

OTHER PUBLICATIONS

Office Action (Mail Date Apr. 23, 2010) for U.S. Appl. No. 11/382,764, filed May 11, 2006; Confirmation No. 6619.
Office Action (Mail Date Sep. 21, 2009) for U.S. Appl. No. 11/382,764, filed May 11, 2006, Confirmation 6619.
Notice of Allowance (Mail Date Oct. 28, 2010) for U.S. Appl. No. 11/382,764, filed May 11, 2006; First Named Inventor Viktors Berstist et al; Confirmation No. 6619.

* cited by examiner

*Primary Examiner* — Brian Zimmerman
*Assistant Examiner* — Yong Hang Jiang
(74) *Attorney, Agent, or Firm* — Schmeiser, Olsen & Watts; Mark Vallone

(57) ABSTRACT

The present invention provides a system that records, at a remote location, the current status of a door lock. This invention provides a key fob device, which records the current status of a door look. The key fob indicates to the user the current lock status of the given door(s) in question. The key fob is a small key chain attached device, which records the state of the door locks, or other devices or appliances, as one departs from the door. The system of the present invention comprises a sensor at the door that detects the current lock status of a door and transmits this lock to the key fob. Also incorporated into the key fob is circuitry that receives and records this received lock status. A display component in the key fob displays this current lock status when prompted by the user.

10 Claims, 4 Drawing Sheets

KEY FOB AND SYSTEM FOR INDICATING THE LOCK STATUS OF A DOOR LOCK

CROSS-REFERENCE TO RELATED APPLICATIONS

This application is a continuation of the application Ser. No. 11/382,764 filed on May 11, 2006, now U.S. Pat. No. 7,898,382 status.

FIELD OF THE INVENTION

The present invention relates to a device and system for remotely determining the lock status of a door and in particular to a key fob and system that indicates the current lock status of a door lock by detecting the opened/closed state of a door and broadcasting the state of the door along with the a time stamp to the key fob each time the conditions of the door change.

BACKGROUND OF THE INVENTION

When one leaves the house, the car or other location, which may have a lock on the door, we often, but not every time, want to leave that door locked. When humans perform a task repeatedly often enough, the task becomes so automatic that they may not even be consciously aware of doing it. As a result, when a person leaves the house, they often try to think back and wonder if we really locked the door or not. Often, we return to check the status of the lock, wasting considerable time. If we do not go back and check, we worry about the lock and become less productive.

U.S. Pat. No. 5,568,120 discloses a remote controlled anti-theft system for transportation vehicles allows the user to easily determine at will if a faulty door position sensor or an open door will inhibit proper operation of the anti-theft system by pressing the lock button on the remote transmitter in a predetermined sequence. A first lock code from the remote transmitter initiates a locking and arming sequence of the anti-theft system. A second lock code received within a predetermined time of the first lock code causes an audible verification to be produced identifying whether the anti-theft system is successfully arming or whether a door ajar or faulty door sensor is preventing the anti-theft system from arming.

U.S. Pat. No. 6,703,919 discloses a method of confirming a lock button pressed condition for a remote device associated with a vehicle remote keyless entry system. The method includes setting a counter to zero then, continuously monitoring the remote device for a remote device button activation. If a lock button activation is detected, the counter is increment by one. Otherwise, if an unlock button activation is detected, the counter is reset to zero. When the counter is greater than one an indicator on the remote device is activated in response to the detection of either a lock button or unlock button activation. In one embodiment, the indicator is an LED which is activated only when, upon detecting a lock button activation, a lock button activation was immediately previously detected. If at any time after initial lock button activation, the unlock button is activated, the LED indicator will not illuminate.

U.S. Pat. No. 6,259,362 discloses a system (10) for a vehicle (12), wherein the system includes transmitter components (26, 28), located at the vehicle, that are operable to send communication that conveys a vehicle system status. A portable receiver unit (14) is operable to receive the communication that conveys the vehicle system status. An operator (76) of the vehicle (12) carries the portable receiver unit (14) upon leaving the vehicle. A controller (22) senses a condition indicative of the vehicle operator (76) leaving the vehicle (12) and enables the communication from the transmitter components (26, 28) to the portable receiver unit (14) in response to the sensed condition indicative of the vehicle operator (76) leaving the vehicle (12). Preferably, a device (44) enables operation of the portable receiver unit (14) in response to the sensed condition indicative of the vehicle operator (76) leaving the vehicle (12).

U.S. Pat. No. 6,097,282 discloses a memory device having the function of detecting the locking or unlocking condition of a remote controller comprises a battery, a key circuit a memory unit, a light emitting element, a testing key, an encoding unit, an infrared ray or a high frequency emitting driving circuit, etc. The positive end of the battery is connected with the power source (V+) of the memory unit. The lock key and unlock key of the key circuit are connected with the respective input end of the memory unit and the encoding unit. The output end of the memory unit is connected with one end of the light emitting element. Another end of the light emitting element is connected with one connection of the testing key and another end of the testing key is grounded. By the action of the testing key, the condition of the remote controller may inform the user. That is, if it is in a lock condition, then the light emitting element will light, while if it is in a "unlock" condition, then the light emitting element will extinguish. Therefore, by the special circuit design, the user may be informed about the message of the remote controller without returning to the original location to know the lock (or unlock) condition of the controller, such as the anti-theft device of a car or a motorcycle, an iron scrolling door, or a host without any setting function.

U.S. Pat. No. 6,429,773 discloses a system for remotely communicating with a vehicle including a wireless device, a security gateway, an on-board computer coupled to one or more sensors or controls, and a web interface that provides for graphical interface between the vehicle and a remote individual. More particularly, a vehicle owner uses the Internet to directly communicate with the vehicle and, using this linkage, can monitor vehicle status (e.g., oil level and quality), read vehicle statistics such as odometer reading and interrogate other sensors as sampled by the on-board computer. Preferably, the owner can also change security functions such as door lock, alarm on, ignition kill "on," and similar functions using this web interface. To assist any vehicle owner with communication with a vehicle, the on-board components or owner's remote browser preferably permit selective downloading of skins, such that a wide variety of customized interfaces may be used to interact with the vehicle, no matter the owner's level of knowledge and sophistication with the vehicle.

The current art describes inventions related to indicating statuses for motor vehicle conditions. There remains a need to for a status indicator system for any type condition in any environment in addition to motor vehicles.

SUMMARY OF THE INVENTION

It is an objective of the present invention to provide a device and system that can indicate the lock status of a door from a remote location.

It is a second objective of the present invention to provide a device that records the current lock status of a door and displays that status when prompted by a user.

It is third objective of the present invention to provide a system that detects the current lock status of a door and transmits that current status to a receiver for storage and later display.

The present invention provides a system that records the current status of a door lock. This invention provides a key fob device, which indicates the current lock status of the given door(s) in question. The key fob is a small key chain attached device, which records the state of the door locks, or other devices or appliances, as one departs from the door. The system of the present invention comprises a sensor at the door that detects the current lock status of a door whenever the condition (open or close) of the door changes and transmits this lock status information to the key fob. Also incorporated into the key fob is circuitry that receives and records this received lock status. A display component in the key fob displays this current lock status when prompted by the user.

The actions of the invention are as follows: When the door is opened, closed or if someone passes through the doorway, this triggers the door device to broadcast the state of the door along with time stamp to nearby receiving devices. The key chain device receives the signal, which momentarily wakes it up, long enough to record the most recent state and time stamp. The state is broadcast repeatedly until the door stops moving or there is no more motion (of people) passing through the doorway. Later, when the user wants to know the state of the door, the user can press a button on the key chain device and it will show the most recent status of the door along with a time stamp.

DETAILED DESCRIPTION OF THE PRESENT INVENTION

Figure 1:
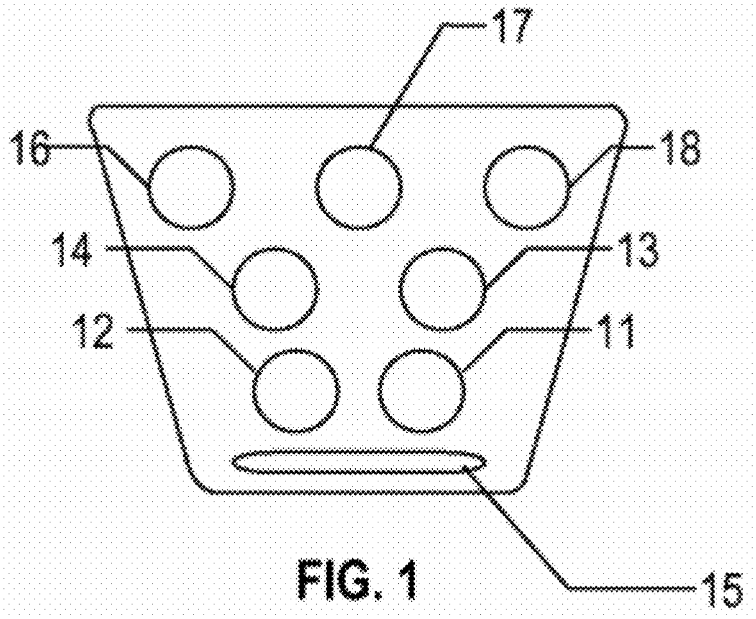
FIG. 1 is an example of a key fob device that can used in the implementation of the present invention.

Referring to FIG. 1, shown is a typical key fob 10 that can be used in the implementation of the present invention. The key fob is a small device that is attached to the key chain along with the user's keys. Many conventional key fobs have controls that enable the user to remotely lock and unlock doors. The key fob of the present invention can have multiple buttons that are pressed to enact certain functions related to locks on a house, car or other facility. The key fob of the present invention can have buttons 11 and 12 that function to lock and unlock a door respectively. Buttons 13 and 14 are optional buttons each of which can control the opening or closing of doors. This feature is implemented primarily on motor vehicles such as mini vans. A panic bar 15 implements an alarm or other distress function. Button 16 implements the feature described in the present invention. When the user desires to know the lock status of the door, the user presses this button to prompt the key fob to display the current lock status of the door. Display lights 17 and 18 illuminate to indicate the lock status of the door. For example, after receiving a display prompt by pressing button 16, display light 17 may light up to indicate that the door is in the locked position. If the display light 18 is illuminated, this would indicate the is the unlocked position. In addition, each light can illuminate in a different color. For example, light 17 could illuminate as a green light and light 18 could illuminate as a red light.

An alternate embodiment to the above-described sets of buttons is to have one button used simply to display the status. Another feature is to have more LED's representing more than one door or device for which status is displayed. Thus with this one button push option, one could see if any of the doors are in the wrong status.

Figure 2:
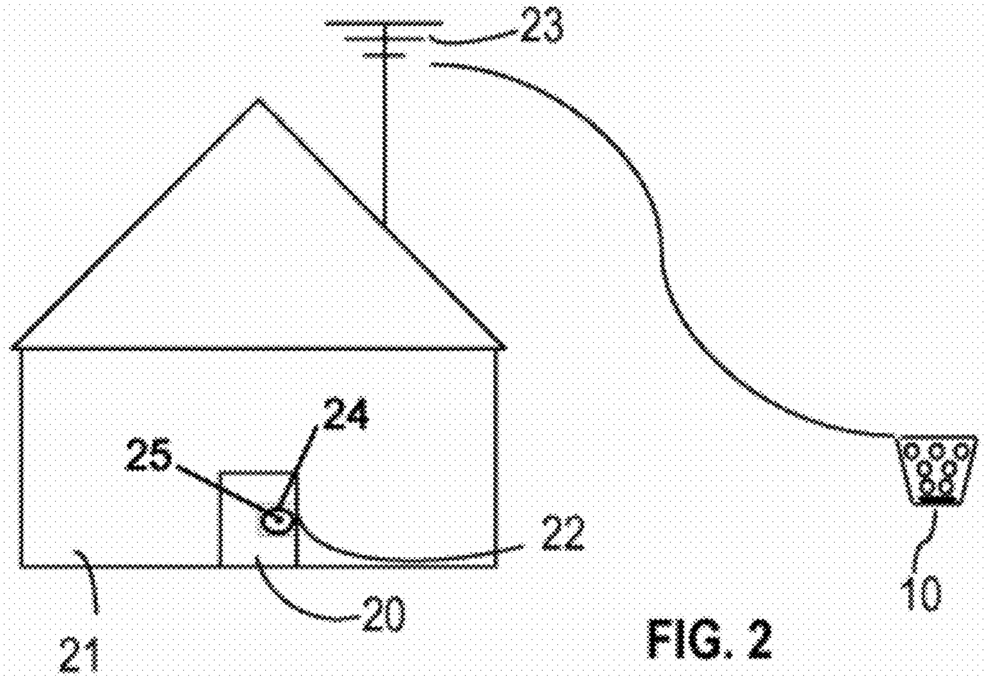
FIG. 2 is an example of the system of the present invention in which a sensor transmits the lock status of a door from the location door location to the key fob.

FIG. 2 illustrates an example of a system in which the present invention is implemented. In this example, the door for which the status is kept is a front door 20 of the house 21. A door lock 22 on the door 20 contains a sensor device 24 that detects the condition of the door lock 22. This condition is sent to the key fob 10 via an antenna 23 on the top of the house 21. Alternatively, a transmitter device 25, which is incorporated into the sensor device 24, transmits the condition of the door lock 22 to the fob 10. The sensor device 24 could be part of a smart house system, which has many sensors that transmit information to a central manager. This central manager has the ability to transmit information to various devices in the house 21. In the present example, the lock condition of the door 20 could be sent to the key fob 10 via the antenna 23. As shown, the key fob 10 can be at a location that is remote to the sensor device 24 and antenna 23.

Since the broadcast range of the sensor device 24 is similar to that of a blue tooth or other local signal, the correct state of the door 20 is captured even if the user puts the door 20 into motion and is not touching it as it slams shut. The sensor device 24 built into the door lock 22 can indicate whether the door 20 is: 1) Closed and locked, 2) Closed and unlocked or 3) Open. Sensor device 24 in the door lock 22 can be triggered to broadcast its door lock status upon motion. A motion detector device can also trigger the broadcast when someone passes through the doorway. A positively locked sensor detects if the door 20 is completely closed and the bolt is fully in the locked position. Other sensor devices can also detect whether the door 20 is open or closed and unlocked, whether a window is unlocked or not, whether the kitchen stove is on or not etc. . . ).

Figure 3:
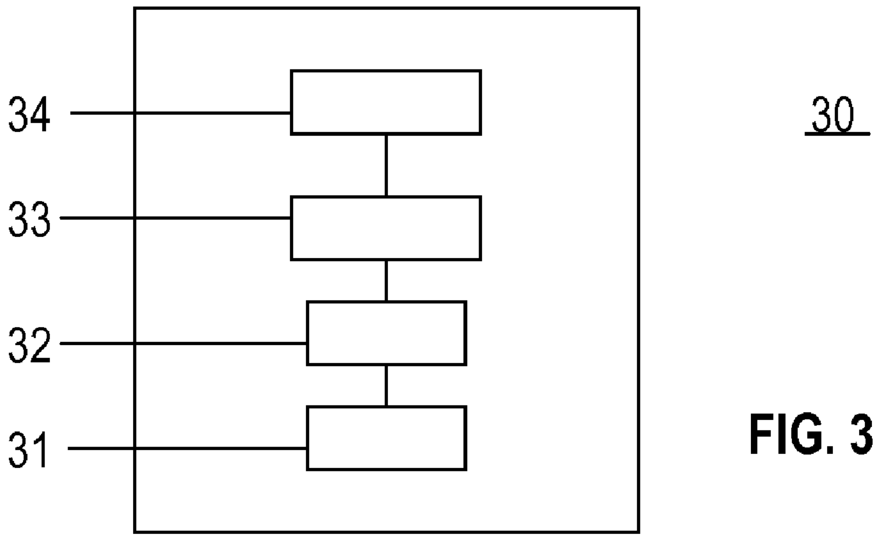
FIG. 3 is a block diagram of the components in the key fob device in accordance with the present invention.

FIG. 3 is a block diagram of the components of the lock status system incorporated into the key fob device in accordance with the present invention. In this system, there is a receiver 30 that receives a lock status signal from the door lock sensor. The receiver 30 may also contain circuitry 31 that converts a received analog signal from the door lock sensor into a digital signal for storage in a memory location. The receiver 30 transmits the received signal to a logic circuit 32 that writes the signal into the memory location 33. When the user desires to know the status of the lock, circuit 34 displays the current lock condition stored in the memory location.

The battery life in the keychain fob device is extended by making use of the broadcast signal to temporarily power a "trigger receive circuit" which turns on the "main receiver circuit" which receives and saves the status in nonvolatile memory. After storing the status, the device goes back to the off state. The "trigger receiver circuit" can be constructed like the transponding version of the Exxon-Mobil Speedpass device. Instead of transponding, it turns on the main receiver. Power for the door broadcast device is not as critical since there are available power sources (house AC wiring, or car battery . . . ) usually available. Furthermore, the status-transmitting device need not consume any power except for the motion sensor (not motion of the door), if one is used. The motion sensor for the door itself can be constructed to automatically turn on the power. This can be done with a sloshing mercury switch arrangement, or a sensitive cantilevered accelerometer, which closes a connection upon sensing motion of the door.

Figure 4:
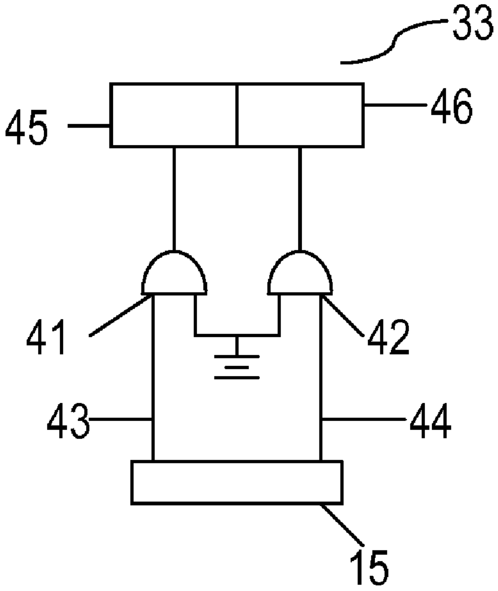
FIG. 4 is an illustration of a basic concept for a receiver and storage circuit incorporated into the key fob device in accordance with the present invention.
Figure 5:
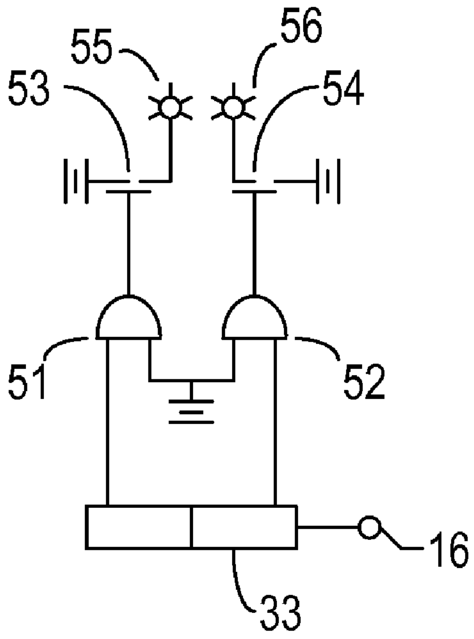
FIG. 5 is an illustration of a basic display circuit incorporated into the key fob device in accordance with the present invention.

FIG. 4 is an illustration of a basic concept for a receiver and storage circuit incorporated into the key fob device in accordance with the present invention. An implementation of this concept is illustrated using digital circuitry components. This circuits described herein are only examples of basic circuit that can be used to accomplish the objectives of the storage and display functions in the key fob of the present invention. FIGS. 4 and 5 illustrate the function of the display circuit using logic AND gates. These gates are used as an illustration of one configuration. Other circuit designs that cover the intent of the presently described circuits can be easily configured by those skilled in the art. One such alternate is to directly wire the circuit without the AND logic gates.

The circuit depicted in FIG. 4 is representative of the logic circuit 32 of FIG. 3 and can comprise a pair of AND gates 41 and 42 that transmit this signal to the memory location 33. The signal that indicates the lock status of the door could comprise a two digit binary signal. This signal would have two conditions, locked and unlocked. In this example, a binary signal of '1 0' would indicate an unlocked door. A binary signal of '0 1' would indicate a locked door. Each AND gate 41 and 42 has two inputs. One input in each gate has a fixed input of '1'. The other input 43 and 44 in each gate receives one of the digits of the binary signal. Because one input of a gate is tied to '1', the output of that AND gate will be the same as the input signal received at that gate. The output from each gate is stored in the memory location 33. If the binary signal is a '1 0', the memory location will have a '1' in field 45 and a '0' in field 46.

FIG. 5 is an illustration of a basic display circuit representative of the circuit 34 of FIG. 3 and is incorporated into the key fob device in accordance with the present invention. This circuit has two AND gates 51 and 52. Each AND gate has an input fixed at "1". The memory location 33 supplies the additional input to each AND from the binary digits stored in the memory fields. Each memory field supplies an input to one of the AND gates. The output of each AND gates powers a pass transistor 53 and 54. Each transistor connects a power source to a light 55 and 56. These lights illuminate based on the status of the lock. When the user desires to know the status of the lock, the user can press button 16. In response to this action, a prompt is sent to the memory which sends the data in the memory fields to the AND gates 51 and 52. In the present example, the binary signal will always contain a "1" and a "0". The AND gate receiving the '1' input will output a '1' that will cause the connected pass transistor to close thereby illuminating the light connected that transistor.

In an example of the function of the display in FIG. 5, an input of '0 1' would be stored in the memory location 33. The '0' input is go to AND gate 51 and the '1' input would go to AND gate 52. Since both AND gates have an input fixed to one, the output of AND gate 51 is zero. This output would not close the pass transistor 53 and therefore light 55 would not illuminate. The output for AND gate 52 is one. This output would close pass transistor 54 and would illuminate light 56. Depending on the initial settings, the illumination of light 56 could mean that the door is in a locked state. An input signal of '1 0' would indicate that the door is in an open state.

Figure 6:
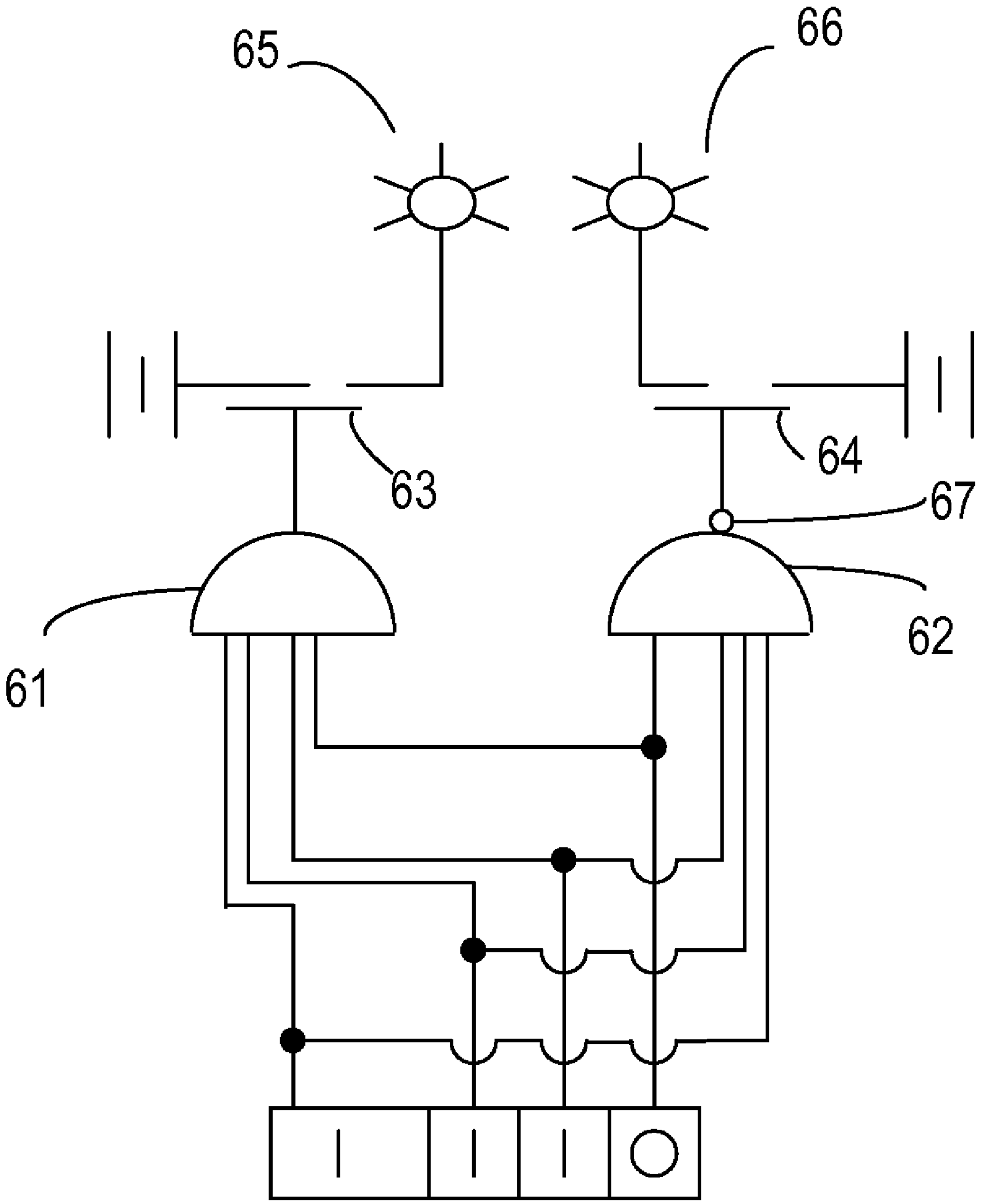
FIG. 6 is an alternate embodiment of a display circuit incorporated into the key fob of the present invention, which incorporates the lock status of multiple locks.

FIG. 6 is an alternate embodiment of a display circuit incorporated into the key fob of the present invention, which incorporates the lock status of multiple locks. This circuit can indicate when one of a set of locks is in an unlocked state. This concept is similar to the concept implemented in motor vehicles, which indicates a door that is ajar. Once the motor is running, an indicator will display a door that is ajar. This system as illustrated in FIG. 6, will indicate if one of the doors in the set is in an unlocked status. This design has two AND gates 61 and 62. Each AND gate has an input for each lock in the set. In this circuit, there are four inputs indicating four locks in the set. AND gate 61 has an output the powers pass transistor 63 that connects light 65 to the power source. AND gate 62 has an output that is sent through an inverter connected to a pass transistor 64 which connect light 66 to a power source. In this circuit, it is desirable to know when all of the doors are in a locked status '1 1 1 1' or when at least one door is in an unlocked status '1 1 0 1'. As a result, AND gate 61 would only illuminate when all inputs were 1's indicating that all doors are in a locked status. If any door is unlocked, the binary number would contain at least one '0'. As a result, AND gate 62 would illuminate. Since both gates will always have the same inputs, the immediate outputs of both gates will be the same. Therefore, in order to cover both locked and unlocked conditions, an inverter 67 is inserted between the output of AND gate 62 and the pass transistor 66. Therefore, if any lock has an unlocked status, a zero input would cause gate 62 to output a '0'. This zero would be inverted such that a '1' output would close the pass transistor 64 and would illuminate light 66 indicating to the user an unlocked door.

Figure 7:
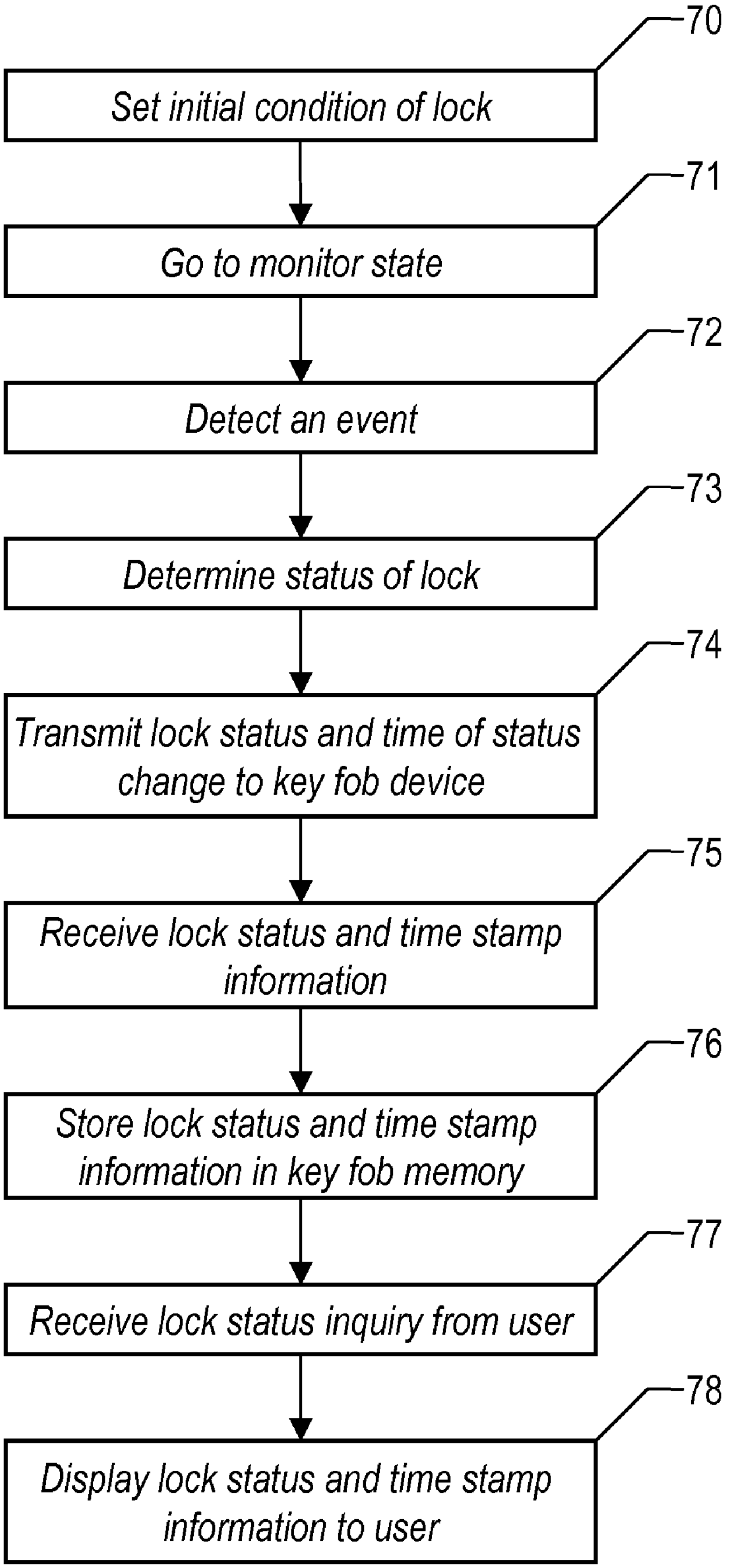
FIG. 7 is a flow diagram of the steps in the implementation of the method of the present invention.

FIG. 7 is a flow diagram of the steps in the implementation of the method of the present invention. The initial step 70 is to establish the initial status of the lock. The user can determine this initial status at any time. This step can also be an optional step in the process. After establishing an initial lock status setting, the process goes to a monitoring mode. In this step 71, the key fob receiver awaits a status change signal from the lock sensor. In step 72, the sensor detects an event that could change the status of door lock. An event could be the opening of the door or the insertion of a key into the door lock. Step 73 determines the current status of the door lock in response to the change in condition of the door lock. The current status of the door can be one of several options. The number of options will depend on the complexity of the system. The most basic system can have only the locked and unlocked statuses. Step 74 transmits this current status of the door lock to the key fob. The time of the status change is also transmitted to the key fob. Step 75 receives the status and time at the key fob via a receiver circuit. As previously mentioned, the broadcast signal powers a "trigger receive circuit" in the fob device which turns on the "main receiver circuit" which receives and saves the status in nonvolatile memory. In step 76, this lock status and time are stored in a memory location in the key fob. After storing the status, the device goes back to the off state. When the user desires to know the status of the lock, the user prompts the key fob via a button on the key fob. In step 77, the key fob display circuit receives the prompt and displays the lock status stored in the memory to the user in step 78.

Alternate embodiments can include additional information. For example, status of all of the doors in the house, car, etc can be transmitted in addition to the door actually used. Thus one would know if all of the doors were locked. Also, this device could use the information provided by a conventional home security system to collect the status information for broadcast. When more status is shown, repeated pushes of the key chain device button would roll through the different statuses. Or, a collective status message such as "all doors locked" would suffice in specific situations.

The device could be used for other "did I remember to" situations such as:

1. Did I turn off the oven?
2. Did I turn off the computer?
3. Did I feed the dog?
4. Did I leave my convertible top down or windows open? . . . because it looks like rain . . . .
5. Did I put the milk back into the refrigerator? (in conjunction with a pervasive device refrigerator that keeps track of what you took out and put back in)
6. Did I take the garbage out?

It is important to note that while the present invention has been described in the context of a fully functioning data processing system, those skilled in the art will appreciate that the processes of the present invention are capable of being distributed in the form of instructions in a computer readable physically tangible storage medium or device. Examples of computer readable physically tangible storage media or devices include media or devices such as EPROM, ROM, tape, paper, floppy disc, hard disk drive, RAM, and CD-ROMs.

The invention claimed is:

1. A method for remotely determining a status of a door lock, said method comprising:

a receiver device receiving a broadcast signal from a broadcast device built into a door, said door lock configured to lock and unlock the door, said receiver device located remotely from the door, said broadcast signal comprising a door lock status of the door lock, said door lock status comprising a first input bit of 0 or 1 and a second input bit of 0 or 1;

a main receiver circuit within the receiver device using a first AND gate and a second AND gate within the main receiver circuit to process the first input bit and the second input bit to generate a first output bit and a second output bit, respectively; and said main receiver circuit storing the first and second output bits in a memory location within the receiver device, wherein the receiver device comprises a display circuit comprising a third AND gate, a fourth AND gate, a first pass transistor, a second pass transistor, a first light and a second light, wherein the third AND gate comprises a first input having a fixed value of 1, a second input, and an output coupled to an input of the first pass transistor, wherein the fourth AND gate comprises a first input having the fixed value of 1, a second input, and an output coupled to an input of the second pass transistor, wherein an output of the first pass transistor is coupled to an input of the first light, wherein an output of the second pass transistor is coupled to an input of the second light, wherein the receiver device is a key fob device comprising a display button which if pressed causes the door lock status in the memory location to be displayed, and wherein the method further comprises:

in response to the display button having been pressed, said second input of the third AND gate and said second input of the fourth AND gate receiving the first output bit and the second output bit from a first field and a second field of the memory location, respectively;

said third AND gate performing an AND of the received first output bit and the fixed value of 1 at the first input of the third AND gate to generate a third output bit;

transmitting the third output bit from the output of the third AND gate to the input of the first pass transistor: (i) to cause, if the third output bit is 1, the output of the first pass transistor to open which triggers illumination of the first light and (ii) to cause, if the third output bit is 0, the output of the first pass transistor to close to which prevents illumination of the first light;

said fourth AND gate performing an AND of the received second output bit and the fixed value of 1 at the first input of the fourth AND gate to generate a fourth output bit;

transmitting the fourth output bit from the output of the fourth AND gate to the input of the second pass transistor: (i) to cause, if the fourth output bit is 1, the output of the second pass transistor to open to which triggers illumination of the second light and (ii) to cause, if the fourth output bit is 0, the output of the second pass transistor to close which prevents illumination of the second light.

2. The method of claim 1, wherein the first and second AND gates each have a first input and a second input, and wherein said using and said storing collectively comprise:

said second input of the first AND gate receiving the first input bit;

said first AND gate performing an AND of the first input bit and a fixed input of 1 at the first input of the first AND gate to generate the first output bit;

transmitting the first output bit from an output of the first AND gate to the first field of the memory location;

said second input of the second AND gate receiving the second input bit;

said second AND gate performing an AND of the second input bit and a fixed input of 1 at the first input of the second AND gate to generate the second output bit; and transmitting the second output bit from an output of the second AND gate to the second field of the memory location.

3. The method of claim 1, wherein the first and second input bits are respectively either 0 and 1 or 1 and 0.

4. The method of claim 1, wherein the broadcast signal further comprises a time at which the door lock status changed from a prior status of the door.

5. The method of claim 1, wherein the key fob device is configured to be attached to a key chain along with keys of a user, said key fob device having objects comprising a first light which if illuminated indicates that the door is locked, a second light which if illuminated indicates that the door is unlocked, a first button which if pressed unlocks the door, a second button which if pressed locks the door, a third button which if pressed opens the door, a fourth button which if pressed closes the door, said display button which if pressed causes the door lock status in the memory location to be displayed via illumination of the first light or the second light, and a panic bar which if pressed activates an alarm function, and wherein the method further comprises displaying the door lock status in response to the display button having been pressed.

6. A computer program product, comprising a computer readable physically tangible storage medium having computer readable instructions stored therein, said instructions configured to be executed by a receiver device to implement a method for remotely determining a status of a door lock, said method comprising:

said receiver device receiving a broadcast signal from a broadcast device built into a door, said door lock configured to lock and unlock the door, said receiver device located remotely from the door, said broadcast signal comprising a door lock status of the door lock, said door lock status comprising a first input bit of 0 or 1 and a second input bit of 0 or 1;

a main receiver circuit within the receiver device using a first AND gate and a second AND gate within the main receiver circuit to process the first input bit and the second input bit to generate a first output bit and a second output bit, respectively; and said main receiver circuit storing the first and second output bits in a memory location within the receiver device, wherein the receiver device comprises a display circuit comprising a third AND gate, a fourth AND gate, a first pass transistor, a second pass transistor, a first light and a second light, wherein the third AND gate comprises a first input having a fixed value of 1, a second input, and an output coupled to an input of the first pass transistor, wherein the fourth AND gate comprises a first input having the fixed value of 1, a second input, and an output coupled to an input of the second pass transistor, wherein an output of the first pass transistor is coupled to an input of the first light, wherein an output of the second pass transistor is coupled to an input of the second light, wherein the receiver device is a key fob device comprising a display button which if pressed causes the door lock status in the memory location to be displayed, and wherein the method further comprises:

in response to the display button having been pressed, said second input of the third AND gate and said second input of the fourth AND gate receiving the first output bit and the second output bit from a first field and a second field of the memory location, respectively;

said third AND gate performing an AND of the received first output bit and the fixed value of 1 at the first input of the third AND gate to generate a third output bit;

transmitting the third output bit from the output of the third AND gate to the input of the first pass transistor: (i) to cause, if the third output bit is 1, the output of the first pass transistor to open which triggers illumination of the first light and (ii) to cause, if the third output bit is 0, the output of the first pass transistor to close to which prevents illumination of the first light;

said fourth AND gate performing an AND of the received second output bit and the fixed value of 1 at the first input of the fourth AND gate to generate a fourth output bit;

transmitting the fourth output bit from the output of the fourth AND gate to the input of the second pass transistor: (i) to cause, if the fourth output bit is 1, the output of the second pass transistor to open to which triggers illumination of the second light and (ii) to cause, if the fourth output bit is 0, the output of the second pass transistor to close which prevents illumination of the second light.

7. The computer program product of claim 6, wherein the first and second AND gates each have a first input and a second input, and wherein said using and said storing collectively comprise:

said second input of the first AND gate receiving the first input bit;

said first AND gate performing an AND of the first input bit and a fixed input of 1 at the first input of the first AND gate to generate the first output bit;

transmitting the first output bit from an output of the first AND gate to the first field of the memory location;

said second input of the second AND gate receiving the second input bit;

said second AND gate performing an AND of the second input bit and a fixed input of 1 at the first input of the second AND gate to generate the second output bit; and transmitting the second output bit from an output of the second AND gate to the second field of the memory location.

8. The computer program product of claim 6, wherein the first and second input bits are respectively either 0 and 1 or 1 and 0.

9. The computer program product of claim 6, wherein the broadcast signal further comprises a time at which the door lock status changed from a prior status of the door.

10. The computer program product of claim 6, wherein the key fob device is configured to be attached to a key chain along with keys of a user, said key fob device having objects comprising a first light which if illuminated indicates that the door is locked, a second light which if illuminated indicates that the door is unlocked, a first button which if pressed unlocks the door, a second button which if pressed locks the door, a third button which if pressed opens the door, a fourth button which if pressed closes the door, said display button which if pressed causes the door lock status in the memory location to be displayed via illumination of the first light or the second light, and a panic bar which if pressed activates an alarm function, and wherein the method further comprises displaying the door lock status in response to the display button having been pressed.

* * * * *